US008645830B2

(12) United States Patent
Chevallier et al.

(10) Patent No.: US 8,645,830 B2
(45) Date of Patent: Feb. 4, 2014

(54) METHOD OF CREATING A SUMMARY OF A DOCUMENT BASED ON USER-DEFINED CRITERIA, AND RELATED AUDIO-VISUAL DEVICE

(75) Inventors: Louis Chevallier, La Meziere (FR); Lionel Oisel, La Nouaye (FR); Jean-Ronan Vigouroux, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 1370 days.

(21) Appl. No.: 11/989,141

(22) PCT Filed: Jul. 7, 2006

(86) PCT No.: PCT/EP2006/064031
§ 371 (c)(1),
(2), (4) Date: Jan. 22, 2008

(87) PCT Pub. No.: WO2007/012556
PCT Pub. Date: Feb. 1, 2007

(65) Prior Publication Data
US 2009/0119591 A1 May 7, 2009

(30) Foreign Application Priority Data
Jul. 25, 2005 (FR) ..................................... 05 52290

(51) Int. Cl.
*G06F 3/00* (2006.01)
(52) U.S. Cl.
USPC .............................. 715/716; 715/721; 386/200
(58) Field of Classification Search
USPC .............................. 715/716, 721; 386/52, 200
See application file for complete search history.

(56) References Cited

U.S. PATENT DOCUMENTS

| 543,467 | A | | 7/1995 | Abecassis | |
|---|---|---|---|---|---|
| 5,434,678 | A | * | 7/1995 | Abecassis | ........................ 386/52 |
| 6,807,362 | B1 | * | 10/2004 | Girgensohn et al. | ............ 386/52 |
| 7,075,591 | B1 | | 7/2006 | Jun et al. | |
| 7,548,565 | B2 | * | 6/2009 | Sull et al. | ...................... 370/503 |
| 2005/0141859 | A1 | | 6/2005 | Cheatle | |
| 2006/0253780 | A1 | * | 11/2006 | Munetsugu et al. | .......... 715/719 |

FOREIGN PATENT DOCUMENTS

| EP | 0782139 | 7/1997 |
|---|---|---|
| EP | 1094409 | 4/2001 |
| EP | 1134740 | 9/2001 |
| JP | 7175816 | 7/1995 |

(Continued)

OTHER PUBLICATIONS

Search Report Dated Oct. 18, 2006.

(Continued)

*Primary Examiner* — Michael Roswell
(74) *Attorney, Agent, or Firm* — Tutunjian & Bitetto, P.C.

(57) ABSTRACT

The invention describes a creation method of a summary of an audiovisual document respecting both the criteria defined by the user and criteria helping in the understanding of said summary. The document is first split into sequences, each sequence associated with attribute values and a dependence parameter. The user first selects the first sequences either manually, or according to attribute values. Then second sequences are added according to the value of the dependence parameters. These added sequences enable a better understanding of the summary thus created. According to an improvement, the user introduces a maximum duration for the summary, first and/or second sequences are withdrawn from the summary if the duration of the summary thus created exceeds the introduced duration. The invention also relates to an audiovisual device for the creation and viewing of the summary.

8 Claims, 5 Drawing Sheets

(56) References Cited

FOREIGN PATENT DOCUMENTS

| | | |
|---|---|---|
| JP | 11238071 | 8/1999 |
| JP | 2001157165 | 6/2001 |
| JP | 2001333353 | 11/2001 |
| JP | 2005033619 | 2/2005 |

OTHER PUBLICATIONS

Nishizawa, T. et al., "Automatic Generation of Video Considering Relationship Between Scenes", Proceedings of 14th Data Engineering Workshop (DEWS 2003), Japan, Data Engineering Technical Group, May 16, 2003 (English Abstract).

* cited by examiner

| Sequence number | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Start time | 0h00 | 0h02 | 0h05 | 0h08 | 0h10 | 0h12 | 0h15 | 0h17 | 0h21 | 0h22 | 0h23 | 0h27 | 0h30 | 0h32 | 0h35 | 0h38 |
| Duration of the sequence | 2 | 3 | 3 | 2 | 2 | 3 | 2 | 4 | 1 | 1 | 1 | 4 | 3 | 2 | 3 | 3 |
| Understanding index | 4 | 1 | 1 | 4 | 6 | 5 | 3 | 1 | 1 | 1 | 5 | 2 | 1 | 1 | 2 | 3 |
| Drama index | 1 | 2 | 1 | 1 | 2 | 3 | 5 | 2 | 1 | 1 | 4 | 5 | 2 | 1 | 1 | 1 |
| Action index | 1 | 1 | 1 | 1 | 2 | 1 | 1 | 1 | 1 | 1 | 2 | 4 | 2 | 1 | 1 | 1 |
| Landscape index | 1 | 1 | 1 | 4 | 2 | 1 | 1 | 1 | 1 | 1 | 1 | 1 | 1 | 1 | 3 | 5 |
| Parental control | 1 | 1 | 1 | 2 | 2 | 3 | 2 | 1 | 1 | 1 | 1 | 2 | 3 | 3 | 1 | 1 |

METHOD OF CREATING A SUMMARY OF A DOCUMENT BASED ON USER-DEFINED CRITERIA, AND RELATED AUDIO-VISUAL DEVICE

This application claims the benefit, under 35 U.S.C. §365 of International Application PCT/EP2006/064031, filed Jul. 7, 2006, which was published in accordance with PCT Article 21(2) on Feb. 1, 2007 in French and which claims the benefit of French patent application No. 05 52290, filed Jul. 25, 2005.

The invention relates to a method for creating a summary of an audiovisual document, and a device for the creation of the summary. The present invention is located within the framework of the display of audiovisual documents.

Today, many devices exist that enable audiovisual programs to be watched. Among these, the following are found: television receivers, decoders, recording receivers of audiovisual programs, etc. A user of such equipment can obtain large quantities of audiovisual information. He therefore has little time to devote to each program and often prefers to browse them by displaying a summary. Programs such as football matches have moments that are more interesting than others, goals for example or the best actions. A user having little time may want to see only a summary composed of the most interesting sequences. Television program broadcasters can transmit audiovisual summaries corresponding to some of the programs that they broadcast. These summaries are, for example, the preview trailers of the films broadcast. But this requires the broadcaster to constitute said summaries. Moreover, the broadcasting of such summaries occupies a non-negligible bandwidth on the broadcast network.

The broadcaster can propose summaries of different lengths. But the user or the viewer cannot himself define the duration and content which remains determined by the broadcaster. He cannot change either the duration or type of sequences constituting the summary, unless by proceeding himself to a partial viewing of the sequence by skipping over some parts of the sequence. For example, for a news program, with the current techniques available to the program designer, the broadcaster must adjust the duration of the sequence to a time determined in advance. A same report can give rise to several edits according to the time of the day at which it is broadcast. For example, a same report broadcast during the one o'clock news can take 5 minutes, however, it must only last for 3 minutes on the eight o'clock news.

Moreover, irrespective of the interest of the viewer for the program or the report and irrespective of the time they have, his presence and his availability are by principle required for the entire duration of the broadcast to be able to assume the correct understanding of the program by the user.

The document U.S. Pat. No. 6,807,362—GIRGENSOHN describes a method for producing a summary coming from an audiovisual document. The document is split into clips of an equal duration and each clip is associated with a dissatisfaction value. The program will extract the clips according to the dissatisfaction value in order to produce a summary.

The document US2005/141859 describes a method to create a summary from sequences of an audiovisual document. A capacity parameter is associates with each sequence and according to this parameter the device incorporates or does not incorporate the sequence in the summary. These two documents show how to produce a summary by selecting sequences having in themselves certain characteristics. None of these documents resolves the problem of improving the understanding of a sequence selected by the user.

The invention relates to a method enabling a summary of an audiovisual program transmitted by a broadcaster to be produced, by granting the user more flexibility with regard to the choice of the duration and/or theme chosen. According to one particular embodiment, the invention enables among other things, the creation of content for which the durations can be adjusted by the user. The audiovisual receiver adjusts the duration of the summary thus created in accordance with the criteria defined by the user.

For this purpose, the invention relates to a method for creating a summary of an audiovisual document recorded in an audiovisual receiver and composed of a set of sequences; characterized in that at least one sequence is associated with a dependence parameter indicating the importance of this sequence for the understanding of all or part of the document, the method comprising:

a selection step of at least one first sequence by the user with a view to its incorporation into the summary, an addition step of second sequences not selected by the user, the added sequences having a determined value of the dependence parameter.

In this manner, the summary thus created comprises both the first sequences selected by the user and the second sequences helping with the overall understanding of the summary. The dependence parameter enables a first sequence to be associated with at least one second one. Second sequences are thus added to the first sequences that are selected by the user, this addition enabling among other aspects the summary to be better understood. According to another improvement, the user introduces a duration for the summary. The total duration of the first and second sequences must not exceed the duration allowed. Hence, the user has better control of the creation of his summary. According to another improvement, the link to the second sequence is associated with a dependence value defining the importance of this second sequence for the understanding of the first sequence. The most important second sequences are added in priority to the summary. In this manner, only the most important sequences are added.

According to another improvement, the dependence value is compared to a default value in order to determine whether the associated sequence is incorporated into the summary. In this manner, the process is autonomous and the user does not need to define the threshold for the selection of the second sequences. According to another improvement, the user introduces the criteria for the selection of the first sequences. In this manner, he does not need to select them manually, the module carries this out by comparing the criterion introduced with attribute values associated with each sequence.

According to another improvement, if the summary exceeds the duration allowed, then a second creation process of a new summary is started by increasing the values of the selection criteria introduced by the user in such a manner as to select fewer first sequences. In this manner, the duration of the summary corresponds to the duration introduced by the user.

According to a variant of the aforementioned improvement, if the summary exceeds the duration allowed, then a second creation process of a new summary is started by increasing the minimum dependence values to select the second sequences. In this manner also, the duration of the summary corresponds to the duration introduced by the user in such a manner as to select fewer second sequences. A third variant consists in combining the aforementioned two variants. According to another improvement, following upon the production of a summary, the method comprises a viewing step of an indication of its duration.

The invention also relates to an audiovisual program receiver comprising a storage means of at least one audiovisual document split into sequences, and a viewing means of the parts at least of said document, characterized in that at least one sequence is associated with a dependence parameter indicating the importance of this sequence for the understanding of all or part of the document, the receiver comprises a selection means of at least one sequence called first, a production means of a summary composed of the first selected sequences and second sequences of said document, said second sequences respecting a determined dependence parameter value.

Other characteristics and advantages of the present invention will emerge from the description of the following embodiments to be taken as non-restrictive examples, made with reference to the figures attached wherein.

Figure 1:
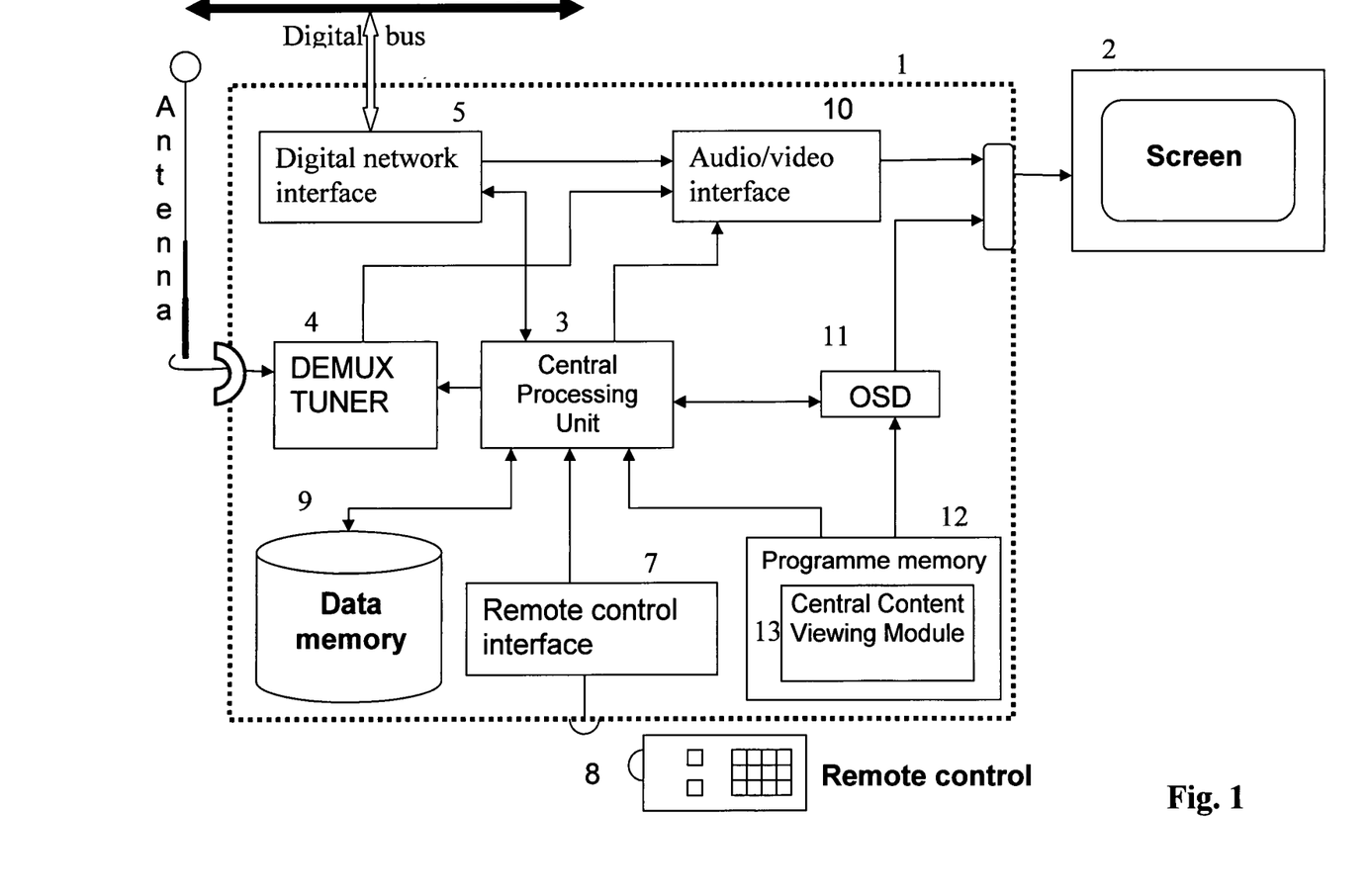
FIG. 1 shows a television receiver for the implementation of the invention.

A description will first be made of the structure of a multimedia receiver 1 equipped with a display device 2 according to an embodiment of the invention. A decoder is described here but other devices can also be considered and apply to the present invention, for example a personal computer or a "PVR" (namely a large capacity, random access recording device, such as for example the THOMSON model DTH7000 produced and marketed by the applicant) or any device able to access audiovisual content and having creation and menu display means. The receiver comprises a central processing unit 3 connected to a programme memory 12, and an interface 5 for communication with a high bit-rate digital bus 6 enabling audio/video data to be transmitted in real time. This network is preferably public and enables access to remote servers; the most common is the IP network. The receiver can also receive audio/video data from a broadcast network through a receiver antenna associated with a demodulator 4. The receiver further comprises an infrared signal receiver 7 to receive the signals of a remote control 8, a memory 9 for the storage of audiovisual content and a database, and an audio/video decoding logic 10 for the generation of audiovisual signals sent to the television screen 2. The remote control is equipped with direction keys ↑, ↓, → and ← and the buttons: "OK" and "Select", the function of which will be described later. The memory 9 is advantageously a hard disk of several hundreds of megabytes, enabling several hours at least of the audiovisual content to be recorded. This audiovisual content is identified by a title recorded in the database.

The receiver also comprises a display circuit 11 of data on the screen, often called OSD circuit, "On Screen Display". The OSD circuit 11 is a text and graphics generator that enables the on screen display of menus, pictograms (for example, a number corresponding to the channel displayed) and that can display the navigating menus in accordance with the present invention, and notably one or more button bars. The OSD circuit 11 is controlled by the Central Processing Unit 3 and a software module 13 recorded in the memory 12. The software module 13 is advantageously realized in the form of a program recorded in read-only memory. It can also be realized in the form of an ASIC type specialized circuit for example.

The digital bus 6 and/or the broadcast network transmit, to the receiver, data comprising multimedia content and descriptive data of this content. The descriptive data comprises classification elements generally called "attributes", of the accessible multimedia content. The descriptive data is for example metadata defined according to the MPEG7 standard. This data is among other things attribute values enabling documents to be characterized according to certain criteria. In the present invention, the document is split into sequences by the supplier who also initializes the attribute values for each sequence. All the data is stored in the database of memory 9 of the receiver. The module 13 then extracts the information from this database and processes it to produce the browsing menus displayed on the screen and particularly one or more button bars.

After having detailed the different elements of an embodiment, a description will now be made of how these elements cooperate. It should be recalled that the invention is situated in the framework where one wants to allow the viewer to control the duration of an audiovisual document extract composed of sequences and with variable duration, while ensuring a certain degree of understanding. The interaction means with the user enables him to define and handle a dynamic editing to adapt the sequence to the time he wants to dedicate to viewing it.

Figure 2:
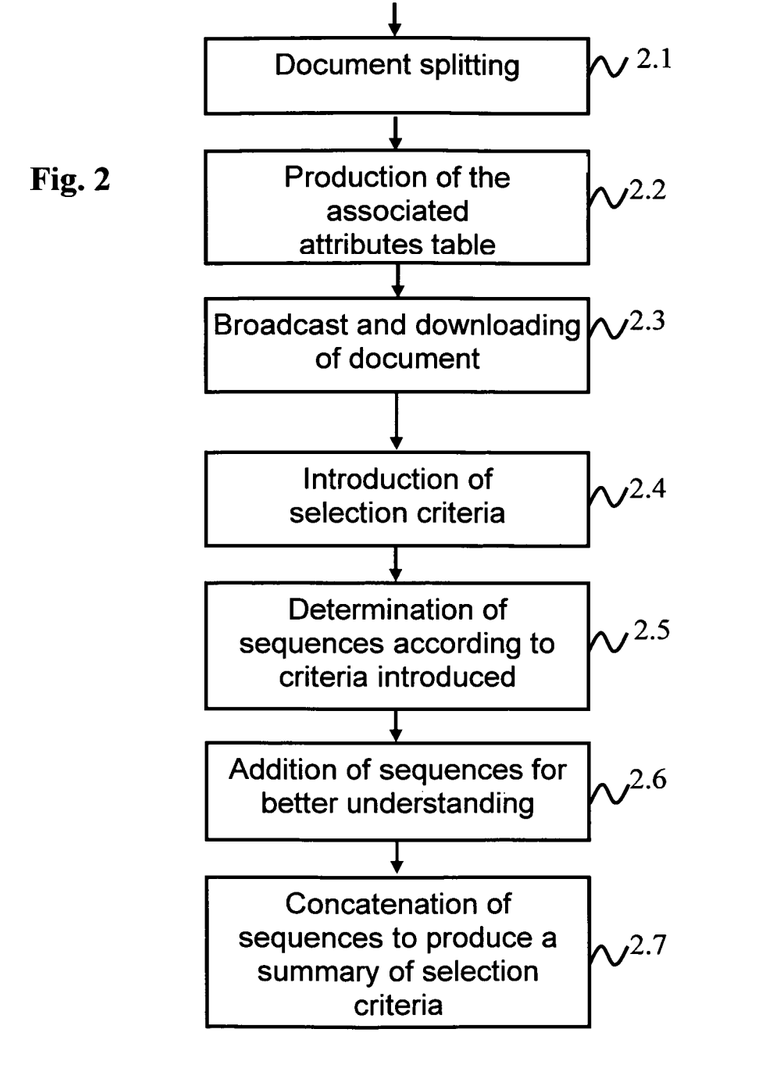
FIG. 2 shows a flowchart of the different steps of the method according to the invention.

FIG. 2 shows an overall flowchart of the operations according to an embodiment of the present invention. Initially, the document is split into sequences (step 2.1) and attribute values associated with criteria are calculated for each sequence (step 2.2).

The first criterion is the duration, each sequence comprises a referenced start time of the document and a duration. A second criterion is the theme. For example, the user can select as a priority, sequences having a strong emotion, the selection module will then select these sequences. In the embodiment, there are several theme criteria: drama, action, presence of landscape. Another criterion is parental control. Each sequence is marked with a code from 1 to 6 defining its level of violence, level 6 being the most violent and normally prohibited for children and adolescents. The user can thus select a level within a range for example of 1 to 4, which prevents the introduction of too violent sequences into the summary. Hence, the introduction of this criterion enables some sequences to be prohibited.

According to an important aspect of the invention, a criterion determined by the producer of the document enables some sequences to be marked as being important for the understanding of the summary being produced. A first variant consists in defining an understanding index. The higher the value of the understanding index for a sequence, the more it is important and useful for the user to follow the continuity of the semantic content of the document. Irrespective of the criteria selected by the user, it is useful that the most important sequences for understanding are incorporated into the summary.

Figure 3:
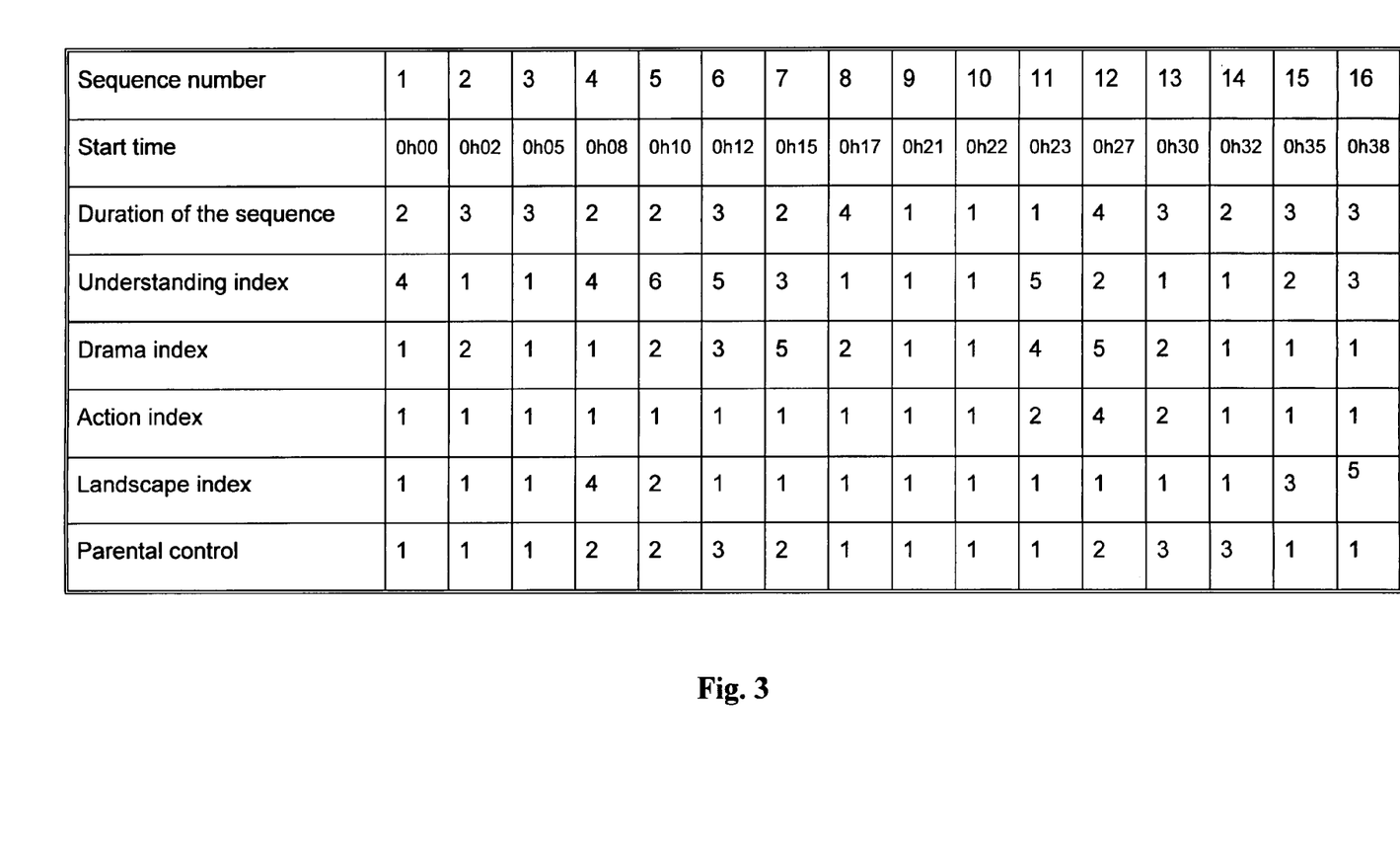
FIG. 3 shows an example of a table of parameters associated with each sequence of the document.

The set of attributes constitutes a table associated with the audiovisual document. FIG. 3 diagrammatically shows such a table.

In the example, the document is split into 16 sequences. This splitting is performed in such a manner that each sequence can be separated from the preceding sequence without denaturing in principle the informative or artistic value of the sequence. At the end of the splitting step into sequences, the document together with the attribute values associated with the sequences are combined to be able to be downloaded in a single block. In the example of FIG. 3, the selection criteria are: the dramatic intensity of the sequence, the intensity of the action, the fact that the sequence shows a landscape, the parental control value. In addition to these four criteria accessible to the user, the table comprises the indication of the duration of each sequence. As will be described below, the user can set a maximum and minimum duration for the summary generated. The duration parameter of the sequence will then be taken into account, as well as the value of the understanding index.

Another variant consists in defining a dependence parameter between sequences. For each "first" sequence, the producer associates or does not associate one or more dependent or "second" sequences that must preferably precede and/or follow the first sequence within a summary. This variant not shown in the table of FIG. 3, consists in using a dependence parameter consisting in a possibly empty list of identifiers of dependent sequences of the first sequence. Assume for example, that the sequence no. 3 is associated with sequence no. 4, then if the sequence no. 3 is selected and viewed according the criteria defined by the user, the sequence no. 4 that does not necessarily meet these criteria, will also be selected. It will be noted that the association is not bijective, such that if the sequence no. 4 is selected, the sequence no. 3 will not necessarily be selected. This variant does not exclude also associating the understanding index with each second sequence enabling a priority to be defined in the choice of second sequences to add. In this manner, the creation program of the summary can determine an order during the addition of the second sequences.

The document is then made available to the users (step 2.3).

Assume that a user selects a document and downloads it with its attribute table. Everything is recorded on the hard disk 9 of the receiver 1. Then the user starts the content viewing module, called "CVM". According to a preferred embodiment, this module is materially a program generated by the microprocessor, although conceptually, this is an application processing data packets, in same manner as an audio or video receiver, for which dedicated circuits are used. In a simple manner, the module presents by means of a menu displayed on the screen information regarding all the documents recorded on the hard disk. The user browses this menu visually highlighting the documents recorded using the direction keys. By pressing the "OK" button of the remote control 11, he starts the execution of the module for the production of a summary of the document highlighted. The execution operation can also be carried out by activating an icon displayed on the screen. Pressing the "END" button of the remote control 11 (or a corresponding icon) enables the CVM module to be exited at any moment.

At the start of its execution, the CVM module displays general information related to the document, for example:
title and textual information (name of the actors, director)
full duration of the document,
number of sequences,
list of the attributes available in the table,
. . . .

Then, the CVM module waits for instructions from the user to enable it to produce a summary of the document. The introduction of values is carried out either by means of the numerical keypad of the remote control 8, or by selecting the icons showing the digits on the screen. In step 2.4, the user selects one or more criteria, by possibly adding an attribute value. In step 2.5, the CVM module sweeps the attribute table and selects all the sequences for which the attributes selected by the user have a value greater than a determined threshold. This threshold is either determined by the user, or it is a default threshold defined by the event producer. For example, the action is attribute defines the level of action of each sequence, the levels of this attribute are evaluated from 1 to 6, where level 6 corresponds to sequences having a great deal of action (a chase scene for example). The user can introduce a minimum level of 3, in which case, all the sequences having a level equal to 3, 4, 5 or 6 are selected by the CVM module.

A variant consists in that the producer of the event himself initializes the value of the level, for example to the value 5. At step 2.6, the CVM module will add sequences that do not match the criteria introduced by the user but will help in the understanding of the summary. In step 2.7, the summary is produced by concatenation of the selected sequences.

According to one simplified embodiment, the user manually selects the first sequences by viewing them or by viewing the images identifying these sequences. The CVM module then adds the second sequences helping in the good understanding of the summary thus created. The selection of the second sequences thus added can be carried out advantageously by taking into account the understanding index associated with each second sequence, the sequences having the best indices for a given first sequence, being added in priority.

An improvement consists in that the summary created by the CVM module does not exceed a duration determined by the user. Using FIG. 4, a description will be given of a production flow chart taking this improvement into account.

Figure 4:
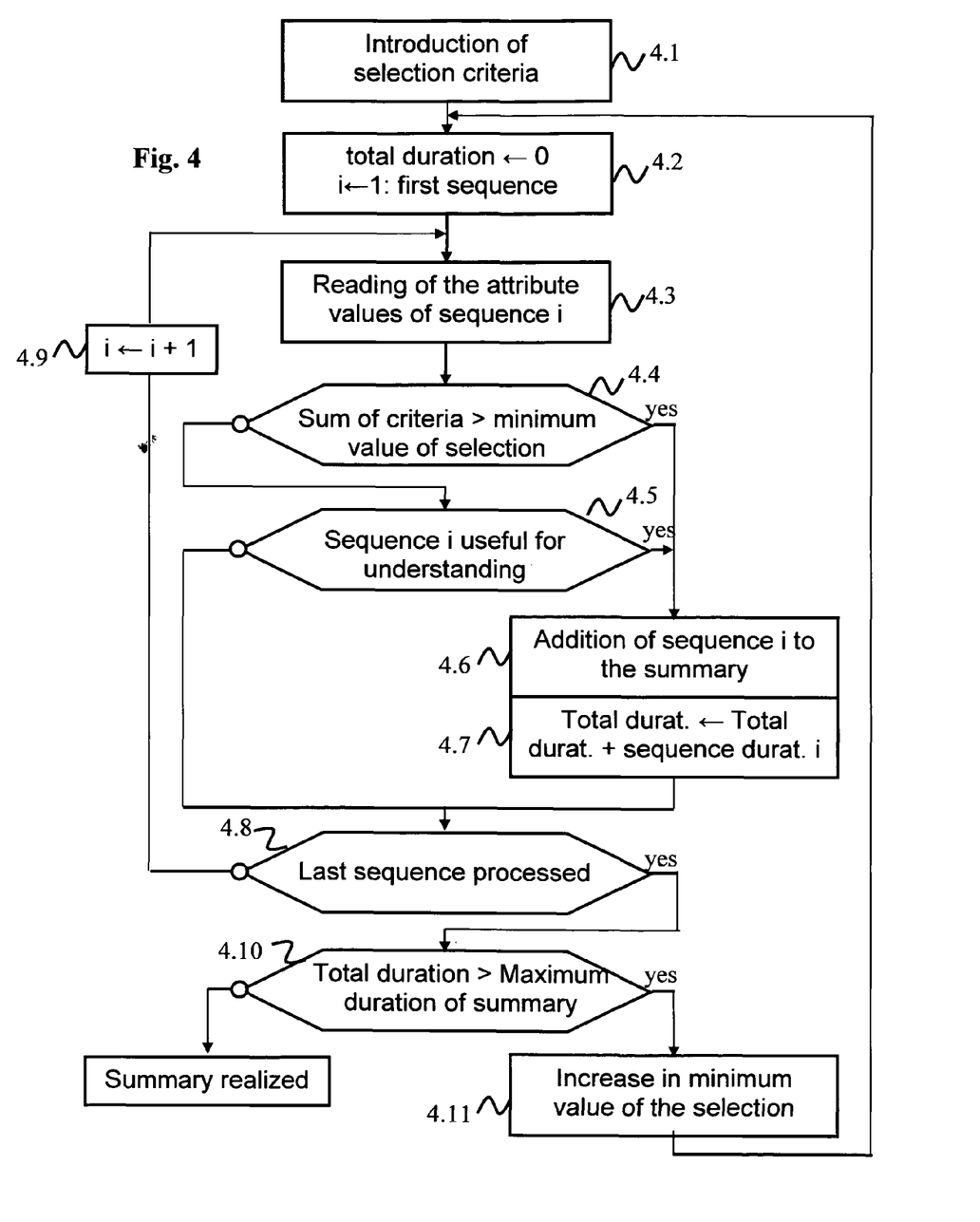
FIG. 4 shows a flow chart of the different steps of an implementation example of the invention.

The user has previously selected a document split up into sequences. In step 4.1, the user introduces at least one production criterion of the summary and a maximum duration. The module then initializes its variables: the duration of the summary being created is set to 0, and the index pointing to the sequences in the table is set to 1 to read the attributes of the first sequence (4.2). In step 4.3, the CVM module reads the attribute values that are associated with the current sequence and that correspond to the production criteria. Then, in step 4.4, the module tests the accumulated value of these attributes and compares it with the minimum selection value. If the value is lower, the module tests whether this sequence would be useful to a good understanding of the summary being created (step 4.5). The test consists in comparing the understanding index with a threshold value. If the understanding index is greater than the threshold, the sequence is retained. If the value is greater than or equal to the selection value, the sequence is also retained. In this case, the sequence is added to the current summary (step 4.6) and the total duration of the summary becomes the previous duration of the added sequence (step 4.7). Otherwise, the end of table test step is reached directly. In step 4.8, the module tests whether the end of table is reached and therefore whether there are no more sequences to process. If this is not the case, the module goes to step 4.9 consisting in increasing the index of the sequences of a unit, then jumping to the reading step 4.3 of attributes of the next sequence. If the last sequence is reached, the module tests whether the total duration of the summary does not exceed the maximum duration indicated by the user (step 4.10). If this is the case, the summary is too long, the CVM module then increases the minimum selection value (step 4.11) and returns to step 4.2. Subsequently, fewer first sequences will be selected in such a manner that the total duration of the summary approaches the duration specified by the user. A variant consists in increasing the threshold value being used to select the second sequences by their understanding indices. In this manner, fewer second sequences will be added in step 4.6, such that the summary thus created will be less long. A second variant consists in increasing both the minimum selection value and the threshold value being used to select the second sequences by their understanding indices. However, if the test of step 4.10 indicates that the total duration of the summary does not exceed the maximum duration indicated by the user, the summary is finalized.

If the important sequences for the understanding are associated with other sequences, then the CVM module will first select the sequences whose total attribute value is greater than the minimum selection value. Once this selection is made, the CVM module sweeps the table a second time and adds all the dependent sequences of one at least previously selected sequence. If the duration is too long, the CVM module eliminates certain first sequences from the selection by increasing the minimum selection value for example, hence the module will retain fewer dependent sequences, and the summary will be less long. In this manner, only the most important second sequences will be added to the summary, until the duration of the summary is reached.

According to an improvement, the CVM module enables the user to control the selection of the sequences added with a view to a good understanding of the summary created. For example, a user, using a base of criteria of dramatic and action intensity to produce the summary, can indicate that the sequences added by the dependence parameter respect a low parental index. In this manner, the scenes added by the CVM module are however subject to a certain amount of control by the user.

Figure 5:
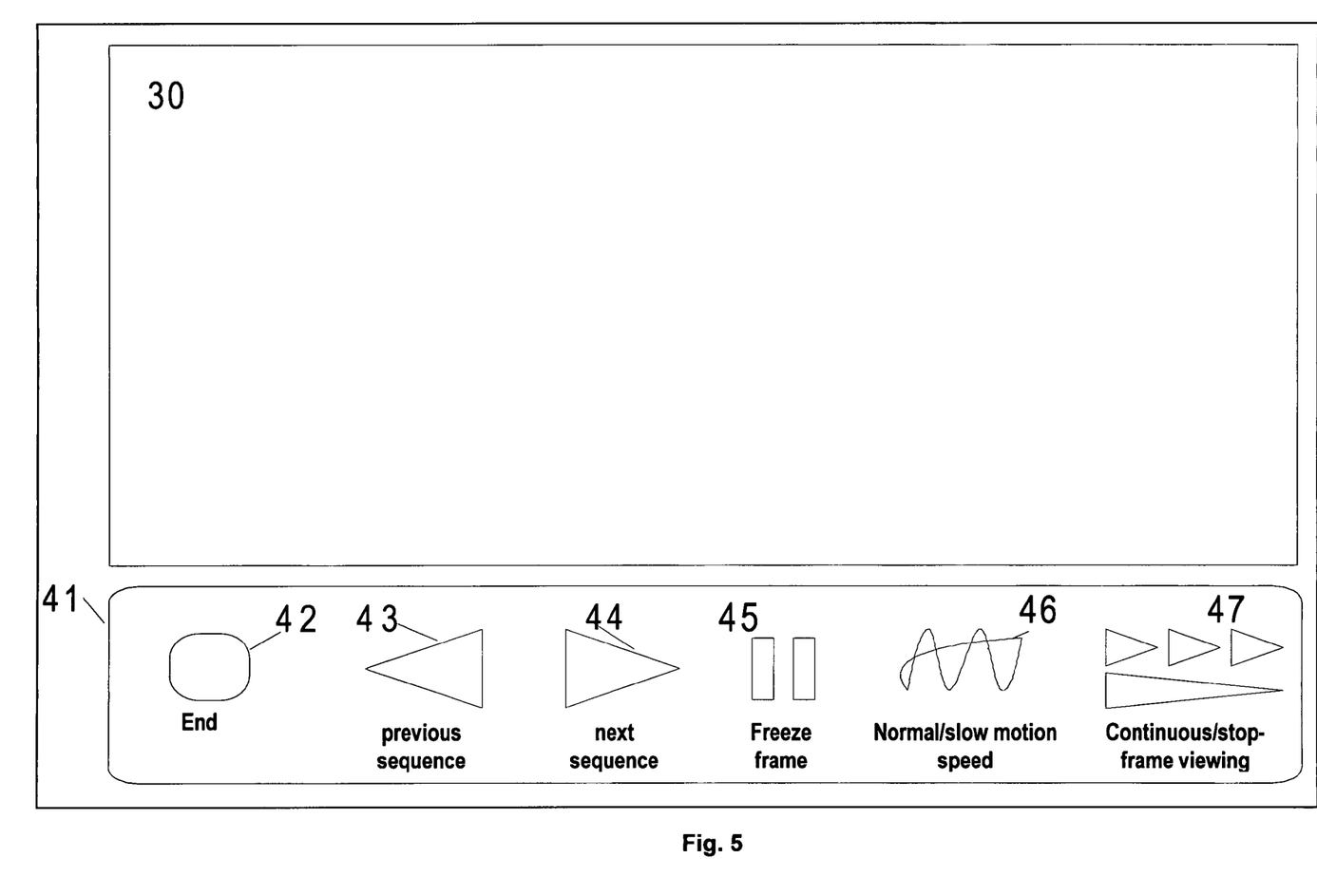
FIG. 5 shows a screen appearance for the control of the content viewing module.

The CVM module integrates viewing commands of the summary thus created. FIG. 5 shows an example of a screen appearance for the viewing of such a summary. The sequences composing the summary appear at the top of the screen 30 and a command banner 41 at the bottom of the screen. This banner contains the following command icons, proposed to the user:

End of CVM, return to normal display of the program (42).
Return to start or to the previous sequence (43).
Skip to next sequence (44).
Freeze frame (45).
Viewing at normal/slow motion speed (46).
Continuous/stop-frame viewing (47).

Advantageously, a window not shown appears on the screen indicating the total duration of the summary and the present time with respect to the start. In this manner, the user sees how much time it will take him to view the summary.

It should be obvious for people skilled in the art that the present invention enables embodiments in many other specific forms without leaving the domain of the invention as claimed. Consequently, the present embodiments must be considered as being examples but can be modified in the domain defined by the scope of the attached claims.

In particular, the invention is not limited to television decoders but can be applied to any device for receiving audiovisual programs. The audiovisual programs can notably be received in the form of a video cassette or any other support enabling an audiovisual program to be transported, the reception means thus becoming a means for reading an audiovisual support.

The invention claimed is:

1. A method for creating a summary of an audiovisual document recorded in an audiovisual receiver and composed of a set of sequences; wherein each first sequence of the document is associated with a one or more other second sequences of the document based on a dependence parameter associating each first sequence with the one or more second sequences, the method comprising:
selecting a duration of reproduction of the summary,
selecting at least one first sequence with a view to its incorporation in the summary,
adding at one or more second sequences to the summary based on a dependence value indicated by the dependence parameter identifying association between the first sequence and the one or more second sequences,
wherein the one or more second sequences associated with the first selected sequences are added to the summary according to their dependence values, beginning with second sequences having the highest dependence values
iteratively repeating said adding step to create the summary according to the selected duration, wherein the iterative repeating of the adding steps is interrupted when the total duration of the summary reaches the selected duration.

2. The method according to claim 1, further comprising, at the level of the receiver, receiving a determined dependence value, the one or more second sequences being added to the summary if its dependence value is greater than the received determined dependence value.

3. The method according to claim 1, wherein the dependence values of each second sequence are calculated at the level of the receiver according to attributes values associated with each second sequence.

4. The method according to claim 3, further comprising selecting of attributes values at the level of the receiver, the dependence value associated with each second sequences being calculated from the selected attributes values.

5. Device for the creation of a summary of audiovisual documents comprising:
storage means for storing at least one audiovisual document split into sequences, and
viewing means for viewing parts of the at least one audiovisual document,
wherein said storage means further comprises dependence parameters consisting in a list of identifiers associating each first sequence with one or more second sequences said dependence parameter including a dependence value assigned to each second sequence,
means for selecting a duration of reproduction of the summary,
means for selecting at least one first sequence,
production means for producing the summary of the audiovisual document composed of the first selected sequences and associated second sequences, said second added sequences being identified in the list associated with the first selected sequence, the production means adding one or more second sequences to the summary according to their dependence values, beginning with the second sequences having the highest dependence values, the production means interrupting an iterative repeating of the addition steps when the total duration of the summary reaches the selected duration.

6. Device according to claim 5, further comprising means for introducing a determined dependence value, wherein if said dependence value of a second selected sequence is greater than the introduced determined dependence value, then the production means adds this second sequence to the summary.

7. The device according to claim 5, wherein the dependence values of each second sequence are calculated at the level of the receiver according to attributes values associated with each second sequence.

8. The device according to claim 7, further comprising selection means for selecting the dependence value attributes at the level of the receiver, the dependence value associated with each second sequences being calculated from the selected attributes values.

* * * * *